(12) United States Patent
Winkelmann et al.

(10) Patent No.: US 10,472,045 B2
(45) Date of Patent: Nov. 12, 2019

(54) SYSTEM FOR LOCKING A FOLDABLE WING TIP ON A WING END OF AN AIRCRAFT

(71) Applicant: Airbus Operations GmbH, Hamburg (DE)

(72) Inventors: Christoph Winkelmann, Hamburg (DE); Johannes Rupp, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 351 days.

(21) Appl. No.: 15/597,582

(22) Filed: May 17, 2017

(65) Prior Publication Data

US 2017/0334544 A1 Nov. 23, 2017

(30) Foreign Application Priority Data

May 20, 2016 (EP) ..................................... 16170603

(51) Int. Cl.
| | | |
|---|---|---|
| *B64C 3/56* | (2006.01) | |
| *B64F 5/60* | (2017.01) | |
| *B64D 47/02* | (2006.01) | |

(52) U.S. Cl.
CPC ................ *B64C 3/56* (2013.01); *B64D 47/02* (2013.01); *B64F 5/60* (2017.01)

(58) Field of Classification Search
CPC ....... B64C 3/56; B64C 23/072; B64C 23/069; B64C 23/076; B64F 5/60; B64D 47/02
See application file for complete search history.

(56) References Cited

U.S. PATENT DOCUMENTS

| | | | |
|---|---|---|---|
| 5,558,299 A * | 9/1996 | Veile ......................... | B64C 3/56 244/49 |
| 9,469,392 B2 * | 10/2016 | Fox ........................... | B64C 3/56 |

(Continued)

FOREIGN PATENT DOCUMENTS

| | | |
|---|---|---|
| EP | 2 730 500 | 5/2014 |
| EP | 3 018 053 | 5/2016 |
| WO | 2011/144298 | 11/2011 |

OTHER PUBLICATIONS

European Search Report cited in Application No. 16170603.1 dated Nov. 18, 2016, five pages.

*Primary Examiner* — Philip J Bonzell
(74) *Attorney, Agent, or Firm* — Nixon & Vanderhye P.C.

(57) ABSTRACT

A system for locking a foldable wing tip on a wing end of an aircraft includes at least one engagement device, at least one locking device comprising a support, a latch element rotatably held in the support and a lock element movably held on the support, a latch drive device coupled with the latch element of the at least one locking device for selectively rotating the latch element at least to an open position, a closed position and a test position, a lock drive device coupled with the lock element of the at least one locking device for selectively varying a distance of the lock element to the latch element between a neutral position and a locking position, wherein the support includes a receiving space extending into an insertion opening designed for receiving the engagement device. The latch element includes a circumferential surface section that selectively covers the insertion opening in an open position and uncovers the insertion opening in a closed position of the latch element. The latch element includes at least one locking recess arranged on a circumferential path of motion for engaging with the lock element in the closed position of the latch element and the locking position of the lock element. The (Continued)

rotatable latch element further includes at least one protrusion on the circumferential path of motion, which acts as a stop for the lock element. The system further includes a signaling device indicating a correct function when the lock element rests on the at least one protrusion.

14 Claims, 5 Drawing Sheets

(56) References Cited

U.S. PATENT DOCUMENTS

| | | | |
|---|---|---|---|
| 9,580,166 B2* | 2/2017 | Good | B64C 3/56 |
| 2015/0210377 A1* | 7/2015 | Good | B64C 3/56 |
| | | | 244/49 |
| 2015/0298793 A1* | 10/2015 | Fox | B64C 3/56 |
| | | | 244/49 |
| 2017/0066521 A1* | 3/2017 | Fox | B64C 3/56 |
| 2017/0152017 A1* | 6/2017 | Good | B64C 3/56 |
| 2017/0334543 A1* | 11/2017 | Wildman | B64C 3/56 |
| 2017/0355441 A1* | 12/2017 | Winkelmann | B64C 3/56 |

* cited by examiner

SYSTEM FOR LOCKING A FOLDABLE WING TIP ON A WING END OF AN AIRCRAFT

RELATED APPLICATION

This application claims priority to European patent application 16170603.1 filed on 20 May 2016, the entirety of which is incorporated by reference.

TECHNICAL FIELD

The invention relates to a foldable wing for an aircraft and an aircraft having a foldable wing.

BACKGROUND OF THE INVENTION

Foldable wing tip mechanisms are known for decades and allow to reduce the necessary storage volume for military aircraft operated on aircraft carriers. The application for commercial aircraft was developed in the 1990s, but has never been used in service.

For fulfilling airworthiness requirements, visual inspections or tests of system items after a defined number of flight cycles or flight hours are required. In some cases in situ inspections or tests are not directly possible and it may be required to remove the equipment from the aircraft. The inspections or tests are then carried out off the aircraft on a workbench. Visual inspections or tests that have to be carried out in situ or off the aircraft are costly, as they restrict the operational flexibility of the aircraft and require maintenance.

WO 2011144298 A1 shows a wing with a retractable wing end piece, wherein a mechanical lever system is used for executing a pivoting motion of a wing end piece comprising both a rotational component and a translational component. The lever kinematics comprises two lever arrangements, for which respective two hinged devices are provided.

SUMMARY OF THE INVENTION

A system has been conceived and invented for locking a foldable wing tip on an aircraft which is less costly in regards to maintenance and inspection.

A system for locking a foldable wing tip on a wing end of an aircraft is has been invented and is disclosed herein. The system includes at least one engagement device having a longitudinal protrusion, at least one locking device comprising a support, a latch element rotatably held in the support and a lock element movably held on the support, a latch drive device coupled with the latch element for selectively rotating the latch element at least to an open position, a closed position and a test position, a lock drive device coupled with the lock element for selectively varying a distance of the lock element to the latch element between a neutral position and a locking position. The support comprises a receiving space extending into an insertion opening designed for receiving the longitudinal protrusion in a transverse direction thereto. The rotatable latch element comprises a circumferential surface section that selectively covers the insertion opening in an open position and uncovers the insertion opening in a closed position of the latch element. The rotatable latch element comprises at least one locking recess arranged on a circumferential path of motion for engaging with the lock element in the closed position of the latch element and the locking position of the lock element. The rotatable latch element further comprises at least one protrusion on the circumferential path of motion, which acts as a stop for the lock element. The system further comprises a signalling device indicating a correct function when the lock element rests on the at least one protrusion.

The system not only allows to latch and lock a foldable wing tip in a predetermined position relative to a base wing, but also provides a simple, yet efficient and reliable monitoring function to detect the proper operation of the system.

An aspect of the system lies in the combination of at least one engagement device having a longitudinal protrusion and at least one locking device that allows to engage the longitudinal protrusion to prevent the motion of the protrusion and, consequently, of the wing tip. For the sake of clarification it is desired to use one locking device per longitudinal protrusion. The locking device itself is of a rather simple design and allows to selectively open and close a receiving space for the longitudinal protrusion such that it may enter or exit the receiving space or is held in place. For increasing the safety of the locking device, additionally a lock element is provided, which is designed to lock the latch element in its closed, i.e. latching position. The lock element is based on a cam-lock principle and comprises a portion that is movable relative to a circumferential surface of the latch element in order to selectively enter or exit a locking recess. The combination of lock element and locking recess is designed to prevent an undesired rotation of the latch element when the lock element engages with the locking recess.

Consequently, to properly function the system a reliable rotatable latch element is desirable which has to be movable between a neutral position and a latching position by device of the latch drive device, as well as the lock element, the lock drive device and the linkage or gear between these components. An undesired situation may be detected, if the desired positions of the latch element cannot be reached or if the lock element does not touch the protrusion of the latch element in its test position. Any of these conditions may result from a failure of the latch or lock drive device, a mechanical connection of the drive device and the latch element or the lock element, or the latch element or the lock element itself.

Providing a monitoring function in the system need not require additional sensors for monitoring the system states of a locking device, but relies on detecting a mechanical state of the locking device, which is either visible for an operator or which may be detectable by investigating sensor information which is already present. For example, the lock and/or latch drive device may already comprise position sensors for detecting their rotational position allowing to conduct a positioning control. When the position of the lock element is blocked due to a surface contact with the protrusion, the sensor information of the lock drive device would reflect this situation.

A protrusion arranged on the circumferential surface of the latch element allows to block the motion of the lock element if the motion path of the lock element and the motion path of the protrusion intersect and if the latch element is in a dedicated test position. The test position is characterized by a position of the latch element, in which the protrusion, that is integrated on the latch element, is located, such that a lock element will touch the protrusion and will not be able to continue a desired motion. The test position may also be characterized by an associated protrusion being located in a position nearest possible to the lock element. In the test position the protrusion acts as an end stop. Hence, by commanding the latch drive device to move the latch element into a test position, the associated lock element will not be able to move further to the circumferential surface than up to the protrusion.

The lock element being blocked by the protrusion leads to a certain orientation of the lock element relative to the latch element, which orientation may be detected in a plurality of different ways, as mentioned above. Hence, the lock element, a portion of the lock element, a certain marking on it, a device for detecting the orientation of the lock element and so forth may be considered a signalling device that allows to identify a proper operation of the respective latch element. Consequently, even without introducing elaborate additional sensor device, a health monitoring function is integratable into a reliable locking and latching system for locking a foldable wing tip in an operating position.

In this context it is pointed out that the installation of the locking device and the engagement device may be done according to own considerations of a skilled person, while it would be advantageous to integrate the active devices, i.e. the latch drive device and the lock drive device, into a base wing, while the at least one engagement device would be advantageously integratable into the wing tip.

In an advantageous embodiment, the lock element is a locking lever swivably supported about a swivel axis in a distance to the circumferential surface section of the latch element, the locking lever having an engagement surface on a first end, the engagement surface adapted to fit into the locking recess. A swivably supported lever allows a gradual approach of an engagement surface to and into a locking recess with a simple and reliable mechanical design. Depending on the actual design of the locking lever, the force that acts on the engagement surface is easily dimensionable by design. Moving the locking lever is conductable through different principles. The lock drive device may provide a rotational motion, which is transferred into the locking lever in form of a rotation about the swivel axis, or the rotation of the lock drive device is transformed into a linear motion, which is introduced into the locking lever through a joint in a distance to the swivel axis. As an alternative, the lock drive device may also comprise a linear actuator, such as a hydraulic or pneumatic cylinder, which directly provides a linear motion.

Still further, the engagement surface may be divided into a first engagement surface section and a second engagement surface section, each following a curved line around a swivel axis with different mean radii of curvature relative to the swivel axis and enclosing a step therebetween. In a simple case, the engagement surface may be created on radial boundary surfaces of two disk sectors that follow on each other, such as a quarter disk sector with a large radius and a quarter disk sector with a small radius. The step between the two engagement surface sections leads to the creation of an edge or a tooth, that firmly engages with the locking recess. However, the step also provides a reliable surface contact with the protrusion on the circumferential surface of the latch element, such that a precise blocking of its motion is realized.

The second engagement surface section may further be designed to always maintain a distance to the at least one protrusion in each possible position of the locking lever and the latch element. The locking lever may freely rotate around the swivel axis up to a bridging surface portion between the two engagement surface sections. This increases the precision of the relative motion of the locking lever relative to the latch element and does not reduce the capability of locking the latch element.

In an advantageous embodiment, the signalling device is an optical signalling device in form of a second end of the locking lever in a distance to the swivel axis. The locking device may be integrated into a wing of an aircraft such that from a certain observation point, the second end of the locking lever is visible if the latch element is in a test position and the locking lever being in a surface contact with the protrusion of the latch element. If such a signalling device is visible to a person on the observation point, the system is considered properly operable. For increasing the visibility of such a signalling device, a certain marking or colour may be used. The simplicity of this embodiment is high, since the observation may be conducted by a person simply through interpretation of a clearly visible mechanical state.

In an advantageous embodiment, the system comprises a plurality of locking devices, the latch drive device being commonly connected to the latch elements of the plurality of lock devices, wherein the protrusions of the latch elements are located at different rotational positions of the individual circumferential surfaces. Resultantly, a plurality of locking devices may be monitored individually. If the protrusions were at the same rotational positions of the circumferential surfaces of the latch elements, the end stops for all locking levers would be present at the same position. Hence, if there is a failure at one of the plurality of locking devices, this would not be detectable, if the lock elements are commonly moved. Hence, by providing a plurality of protrusions at a plurality of associated circumferential surfaces, wherein each locking device has a certain test position, which is different from the test positions of the remaining locking devices, allows individual observations of the health of the system.

In an advantageous embodiment, the system comprises a control unit coupled with the latch drive device and the lock drive device for controlling their operation. The control unit is adapted for conducting a test sequence of the system, the test sequence comprising:
a) inducing a rotation of the latch drive device into a test position,
b) inducing a rotation of the lock drive in direction of the circumferential surface section until it cannot move further.

The control unit, which may be present for operating the latch drive device and the lock drive device per se, is able to provide an automated health test of the system. A plurality of locking devices may be rotated to their individual test positions and the movability of the associated lock devices is then observed. The warning signal may include a mechanical/optical signal as stated above, i.e. after observing a certain end position of the lock elements at the individual locking devices. In this regard, it may be advantageous to either prescribe a certain timing, such that all test positions are observed one after another with a certain pause between the individual test sequences. As an alternative, an observer may be able to provide a signal to the control unit to initiate a subsequent test sequence.

Advantageously, the control unit is additionally adapted for:
c) determining a position of the associated lock element,
d) comparing a determined end position of the lock element and a predetermined end position of the lock element and
e) generating a warning signal if the determined end position and the predetermined end position differ more than about a predetermined tolerance.

Thus, an automated health test is conducted. In this regard, it is not necessary to compare the actual position of the lock device with a predetermined position of the lock device, but to compare the associated rotational position of the lock drive device with a position that is associated with the predetermined position of the lock drive device.

A wing of an aircraft is disclosed comprising: a base wing having a connection region, a movable wing tip, a drive mechanism coupled with the wing tip for moving the wing tip relative to the base wing and a system according to the above description, wherein the at least one engagement device having a longitudinal protrusion is integrated into the wing tip and wherein the at least one locking device is integrated into the base wing at the connection region. The aircraft has at least one such wing.

Further, a method is disclosed for monitoring the system for locking a foldable wing tip on a wing end of an aircraft according to the above. The method may comprise: rotating a latch element, which is rotatably held in a support having a receiving space for a longitudinal protrusion, to a test position, in which a protrusion arranged on a circumferential surface section is arranged in vicinity to a lock element, which is movably held on the support, moving the lock element towards the circumferential surface section until it cannot move further, and observing through a signaling device, whether the position of the lock element corresponds to a predetermined position of the lock element in surface contact with the protrusion.

The method may further comprise: determining a position of the lock device, comparing a determined end position of the associated lock device and a predetermined end position of the lock device and generating a warning signal if the determined end position end the predetermined end position differ more than about a predetermined tolerance.

In case a plurality of locking devices is used, the method may further comprise repeating the steps i) to iii), and iv) to vi), respectively, for an additional latch element and a corresponding lock element, wherein the positions of the protrusions on the associated latch element differs from the protrusions of all remaining protrusions on the associated latch elements.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
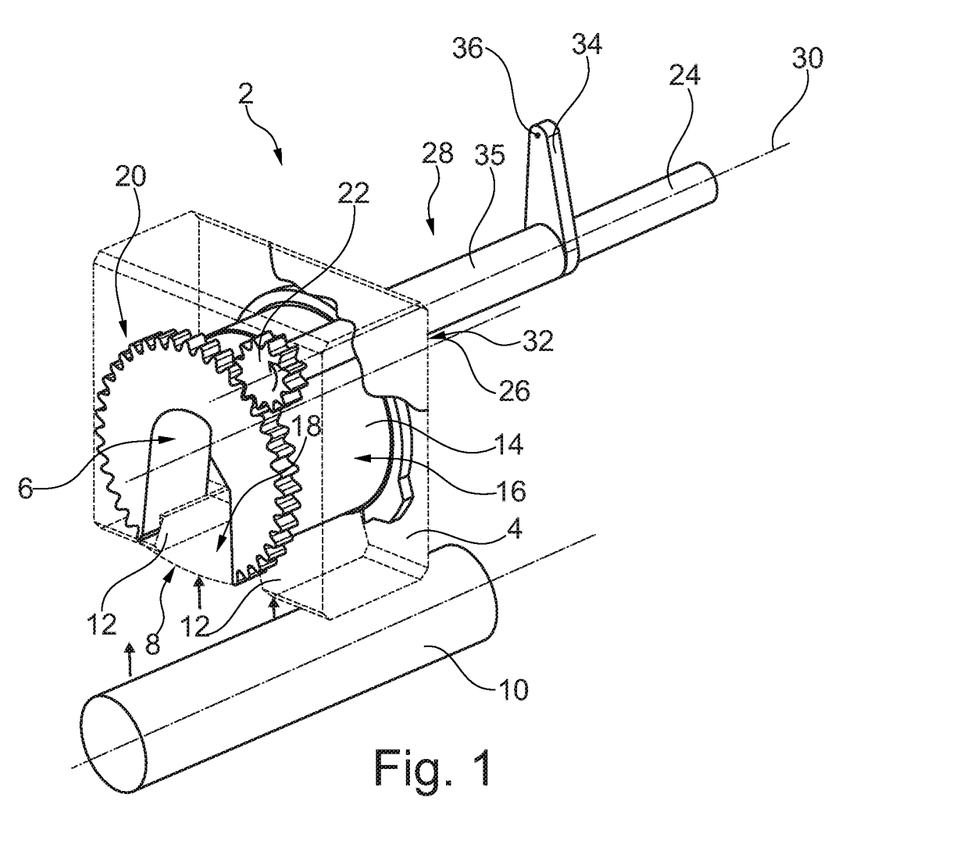
FIG. 1 shows a locking device in a three-dimensional view.

FIG. 1 shows a locking device 2 having a support 4 with a receiving space 6 and an insertion opening 8, through which an engagement device in the form of a longitudinal protrusion 10 may be inserted. The insertion opening 8 exemplarily comprises guiding sheets 12, which provide a tapering into the receiving space 6 and therefore lead to an efficient guiding of the protrusion 10 into to the receiving space 6 to compensate slight inaccuracies of the protrusion motion. The locking device 2 further comprises a rotatably supported latch element 14, which comprises a circumferential surface section 16 having a cut-out 18, through which the protrusion 10 may enter the receiving space 6, when the latch element 14 is in the position shown in FIG. 1, which is referred to as "open" position.

The latch element 14 comprises a gearing 20 at an outer edge delimiting the circumferential surface 16, which gearing 20 engages with a gear wheel 22, which in turn is coupled with a first latch drive shaft 24. By rotating the first latch drive shaft 24 in the indicated direction (counter-clockwise), the latch 14 rotates about a latch axis 26, such that the circumferential surface section 16 gradually moves over the insertion opening 8. If the longitudinal protrusion 10 is resting inside the receiving space 6, it will be held in this position, as the insertion opening 8 is closed.

A lock element 28 in the form of a locking lever is placed concentrically to a rotational axis 30 of the first latch drive shaft 24 and comprises a first end 32 and a second end 34, which extend away from the rotational axis 30 and between which a hollow shaft 35 extends. The design of the first end 32 is shown in detail in the following drawings. The second end 34 may be realized as a cam-like component, which exemplarily comprise a joint 36 at a distal position relative to the rotational axis 30, which joint 36 may be coupled with a linkage (not shown) in order to move the second end 34 and the first end 32, respectively.

Figure 2:
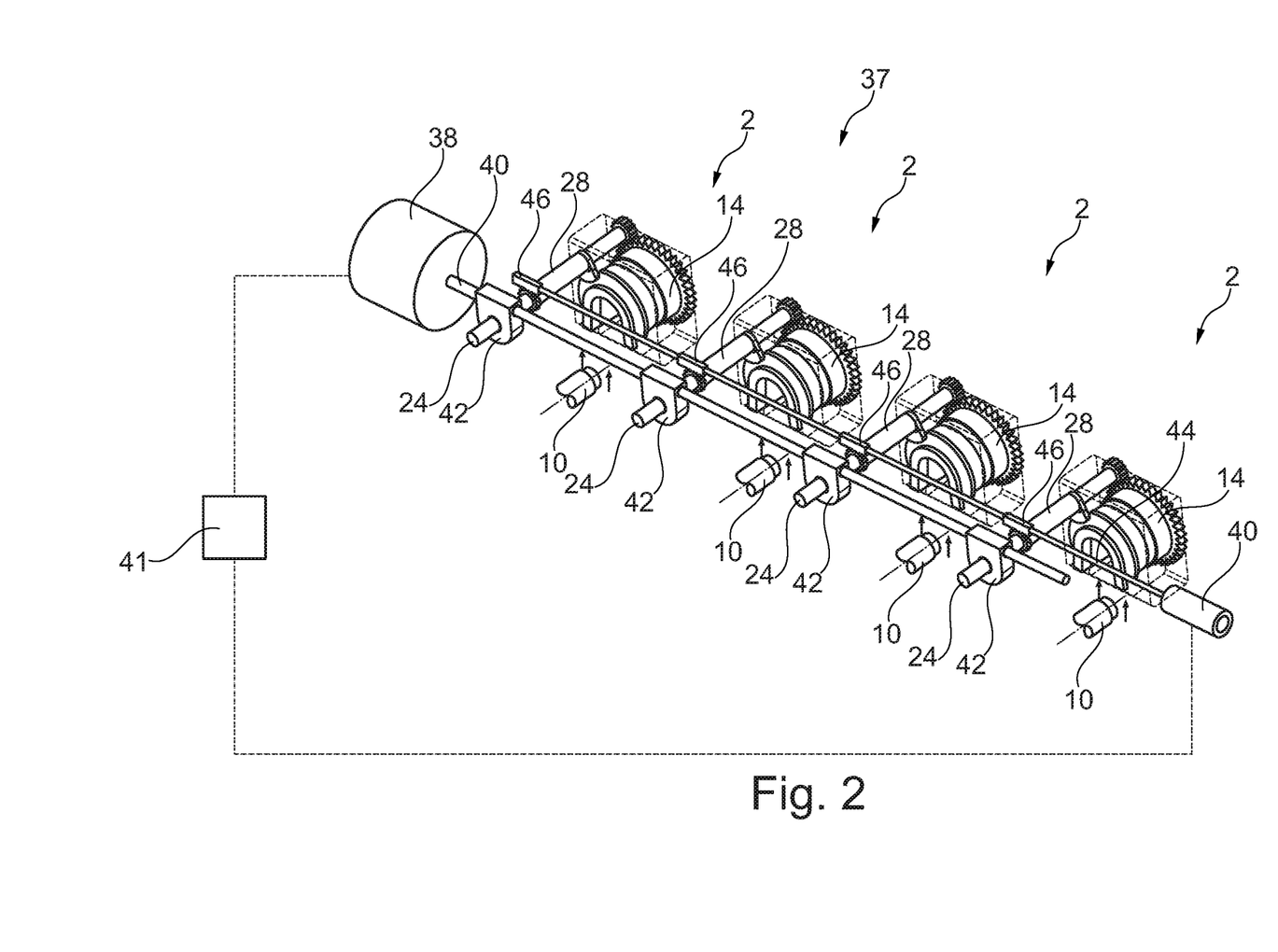
FIG. 2 shows a plurality of locking devices, as well as a lock drive device and a latch drive device connected thereto in a three-dimensional view.

FIG. 2 shows a system 37 for locking and latching, the system 37 having a plurality of locking devices 2, which are coupled with a latch drive device 38, a lock drive device 40 and a control unit 41. The latch drive device 38 exemplarily is realized as a motor providing a rotational motion on a second latch drive shaft 40, which is coupled with a plurality of first latch drive shafts 24 through an angle gear 42 each. Hence, on rotating the second latch drive shaft 40, all first latch drive shafts 24 are rotating in order to move the latch elements 14 into a closed position or an open position (as shown in FIG. 1).

In analogy to this, the lock drive device 40 comprises a lock drive shaft 44, which is coupled with joints 36 of a plurality of locking levers 28 through a spindle gear 46, each. Hence, on rotating the lock drive shaft 44, the spindle gears 46 move the joints 36 of the locking levers 28. Resultantly, the latch elements 14 may be locked or unlocked through driving the lock drive device 40.

FIGS. 1 and 2 only show the basic working principle of the locking function through the use of rotatably supported latch elements 14 and lock elements 32 that may lock the rotatable latch elements 14 in their closed positions. Various latch drive devices and lock drive devices may be realized, e.g. different angle gears or spindle gears may be used. The locking function as well as the monitoring function will be explained in further detail below.

Figure 3A:
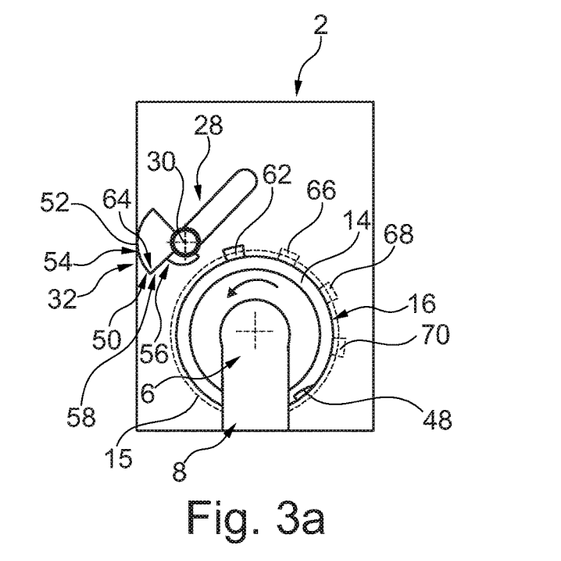
FIG. 3a to 3d show different states of a locking device.

FIG. 3a shows the lock device 2 in a lateral view along the rotational axis 26. Elements, which are not necessary for understanding the latching concept, are left out in this illustration.

Here, the circumferential surface section 16 is shown, wherein its position is to be understood the "open" position, since the receiving space 6 and the insertion opening 8 are accessible from outside the lock device 2. According to the principle shown in FIG. 1, the circumferential surface section will be moved in a counter-clockwise direction to close the insertion opening 8 and to hold the longitudinal protrusion 10 inside the receiving space 6. For locking the locking device 2, a locking recess 48 is integrated into the circumferential surface section 16 and is designed to correspond with the first end 32 of the locking lever 28. For locking the locking device 2, the locking lever 28 will be rotated in a counter-clockwise direction around the swivel axis 30.

The first end 32 of the locking lever 28 has an engagement surface 50, which is created between two opposed edges 52, which are distanced along the swivel axis 30. The engagement surface 50 is further divided in a first engagement surface section 54 and a second engagement surface section 56, which differ in their extension from the swivel axis 30. The first engagement surface section 54 is a lateral surface of a disk sector with a larger radius than a disk sector carrying the second surface section 56. Between both engagement surface sections 54 and 56, a step 58 is created, which comprises a bridging surface 60. The locking recess 58 is adapted for receiving a portion of the first engagement surface section 54 as well as a portion of the bridging surface 60. For better understanding, a three-dimensional view of the locking lever 28 is shown in addition.

The circumferential surface 16 on a circumferential path of motion 15 further comprises a protrusion 62 at a certain position. By moving the lock 14 into a dedicated test position, the protrusion 62 may be placed in direct vicinity of the locking lever 28, such that the movability of the first end 32 is limited.

Figure 3B:
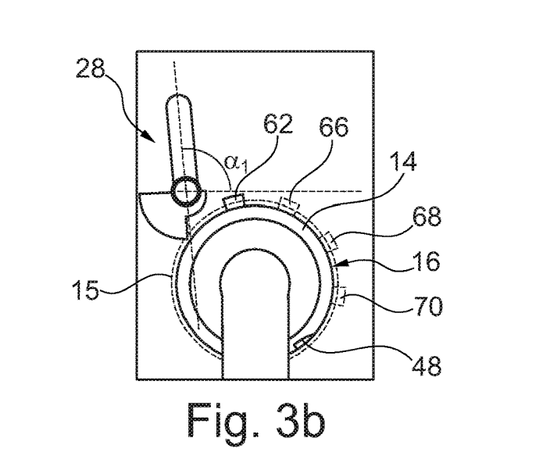

As shown in FIG. 3b, the locking lever 28 may rotate around the swivel axis 30, until an outer edge 64 between the first engagement surface section 54 and the bridging surface 60 touches the circumferential surface 16. The movability of the locking lever 28 may be slightly more than 90°, indicated by $\alpha_1$ in FIG. 3b.

Figure 3C:
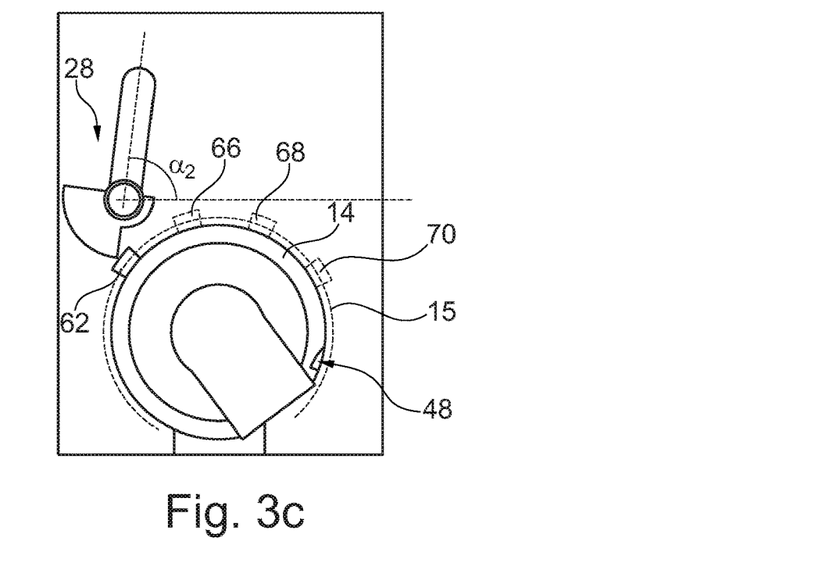

However, FIG. 3c shows the lock 14 in a predetermined test position, in which the protrusion 62 is located in a way to block the motion of the locking lever 28 in relation to the circumferential surface 16. As indicated by $\alpha_2$, the movability in this position is clearly below the open position in FIG. 3b. The protrusion 62 may determine the proper function of the system 37 as a whole. In case any component shown in FIG. 2 fails, the latch element 14 does not rotate or the locking lever 28 does not move, such that a limited movability cannot be observed. However, in case the limited movability can be observed or verified, the proper operation of the system 37 can be confirmed.

Consequently, before operating the lock device 2, the latch element 14 may be rotated into the test position shown in FIG. 3c, afterwards the locking lever 28 is moved up to an end stop, which should be in a position shown in FIG. 3c, where the edge 64 of the engagement surface 50 touches the protrusion 62. If this situation is confirmed, the respective locking device 2 has full functionality. Such a test sequence may be conducted through control commands of the control unit 41.

For controlling the operation of the latch drive device 38 and the lock drive device 40 may comprise a sensor for detecting their actual rotational position, such that a feedback regarding the rotation in response to a commanded position or a commanded rotation is achievable.

As indicated with further dashed protrusions 66, 68 and 70, remaining locking devices 2 may also be equipped with protrusions on their circumferential paths of motion 15, which are arranged at different positions. This allows to subsequently test all different locking devices 2 for their operability. As shown in FIGS. 3a to 3d, the protrusions 62, 66, 68 and 70 are arranged in a clear distance to each other, which may exceed the width of one, two or even three protrusions.

Figure 3D:
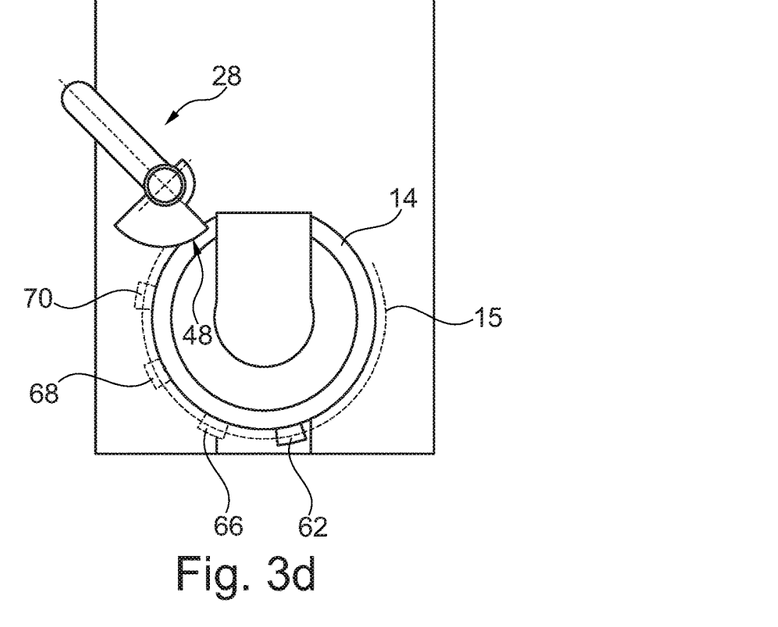

FIG. 3d shows the locking lever 28 engaging with the locking recess 48, such that the latch element 14 is arrested.

Figure 4:
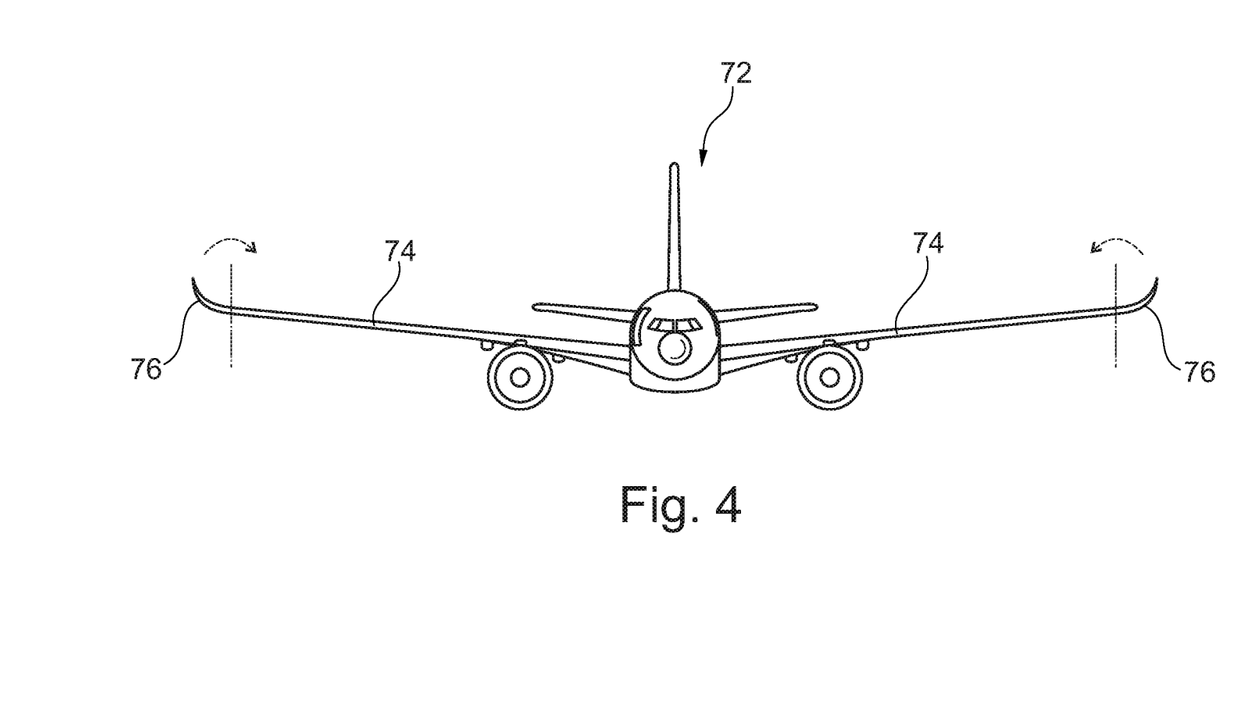
FIG. 4 shows an aircraft having a foldable wing tip including a system for locking and latching the wing tip.

Finally, FIG. 4 shows an aircraft 72 having base wing 74 and wing tip 76 movably supported thereto, wherein each wing tip 76 is locked and latched in the position shown in FIG. 4 through a system (37) shown in the previous illustrations.

The system (37) for locking a foldable wing tip on a wing end of an aircraft, the system (37) may be embodied as including: at least one engagement mechanism (10), at least one locking device (2) comprising a support (4), a latch element (14) rotatably held in the support (4) and a lock element (32) movably held on the support (4), a latch drive device (38) coupled with the latch element (14) of the at least one locking device (2) for selectively rotating the latch element (14) at least to an open position, a closed position and a test position, a lock drive device (40) coupled with the lock element (28, 32, 34) of the at least one locking device (2) for selectively varying a distance of the lock element (32) to the latch element (14) between a neutral position and a locking position, wherein the support (4) comprises a receiving space (6) extending into an insertion opening (8) designed for receiving the engagement device (10), wherein the rotatable latch element (14) comprises a circumferential surface section (16) that selectively covers the insertion opening (8) in an open position and uncovers the insertion opening (8) in a closed position of the latch element (14), wherein the rotatable latch element (14) comprises at least one locking recess (48) arranged on a circumferential path of motion (15) for engaging with the lock element (32) in the closed position of the latch element (14) and the locking position of the lock element (32), wherein the rotatable latch element (14) further comprises at least one protrusion (62, 66, 68, 70) on the circumferential path of motion (15), which acts as a stop for the lock element (32), and wherein the system (37) further comprises a signaling device indicating a correct function when the lock element (32) rests on the at least one protrusion (62, 66, 68, 70).

The lock element (28, 32, 34) may include a locking lever (34) swivably supported about a swivel axis (30) in a distance to the circumferential surface section (16), the locking lever having an engagement surface (50) on a first end (32), the engagement surface (50) adapted to fit into the locking recess (48).

The engagement surface (50) may be divided into a first engagement surface section (54) and a second engagement surface section (56), each following a curved line around the swivel axis (30) with different mean radii of curvature relative to the swivel axis (30) and enclosing a step (58) therebetween.

The second engagement surface section (56) may be configured to be in a distance from the at least one protrusion (62, 66, 68, 70) in each possible position of the lock element (32) and the latch element (14).

The signaling device may be an optical signaling device in form of a second end (34) of the lock element (32) in a distance to the swivel axis (30).

The system (37) may include a plurality of locking devices (2), the latch drive device (38) being commonly connected to the latch elements (14) of the plurality of lock devices (2), wherein the protrusions (62, 66, 68, 70) of the latch elements (14) are located at different rotational positions of the individual circumferential surface sections (16).

The control unit (41) coupled with the latch drive device (38) and the lock drive device (40) may be a processor executing a program to control the operation of the latch drive device and the lock drive device. The control unit may be programed to conduct a test sequence of the system (37), the test sequence comprising:

a) inducing a rotation of the latch drive device (38) into a position corresponding to the protrusion (62, 66, 68, 70) of the at least one latch element (14), b) inducing a rotation of the lock drive device (40) until it cannot move further.

c) determining a position of the associated lock element (32), d) comparing a determined end position of the associated lock element (32) and a predetermined end position of the associated lock element (32) and e) generating a warning signal if the determined end position end the predetermined end position differ more than about a predetermined tolerance.

A wing of an aircraft may include a base wing (74) having a connection region, a movable wing tip (76), a drive mechanism coupled with the wing tip (76) for moving the wing tip (76) relative to the base wing (74), and a system (37), wherein the at least one engagement device (10) is integrated into the wing tip (76) and wherein the at least one locking device (2) is integrated into the base wing (74) at the connection region.

A method for testing the operability of a system (37) for locking a foldable wing tip on a wing end of an aircraft may include:

i) rotating a latch element (14), which is rotatably held in a support (4) having a receiving space (6) for an engagement device (10), to a test position, in which a protrusion (62, 66, 68, 70) arranged on a circumferential surface section (16) is arranged in vicinity to a lock element (32), which is movably held on the support (4), ii) moving the lock element (32) towards the circumferential surface section (16) until it cannot move further, and iii) observing through a signaling device, whether the position of the lock element (32) corresponds to a predetermined position of the lock element (32) in surface contact with the protrusion (62, 66, 68, 70).

iv) determining a position of the lock element (32), v) comparing a determined end position of the associated lock element (32) and a predetermined end position of the lock element (32) and vi) generating a warning signal if the determined end position end the predetermined end position differ more than about a predetermined tolerance.

The method may further comprises repeating the steps i) to iii), and iv) to vi), respectively, for an additional latch element (14) and a corresponding lock element (32), wherein the positions of the protrusions (62, 66, 68, 70) on the associated latch element (14) differs from the protrusions (62, 66, 68, 70) of all remaining protrusions (62, 66, 68, 70) on the associated latch elements (14).

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A system for locking a foldable wing tip on a wing end of an aircraft, the system comprising:

at least one engagement device, at least one locking device comprising a support, a latch element rotatably held in the support and a lock element movably held on the support, a latch drive device coupled with the latch element of the at least one locking device, wherein the latch drive device is configured to selective rotate the latch element at least to an open position, a closed position and a test position, a lock drive device coupled with the lock element of the at least one locking device and configured to selectively vary a distance of the lock element to the latch element between a neutral position and a locking position, wherein the support comprises a receiving space extending into an insertion opening designed for receiving the engagement device, wherein the rotatable latch element comprises a circumferential surface section that selectively covers the insertion opening in an open position and uncovers the insertion opening in a closed position of the latch element, wherein the rotatable latch element comprises at least one locking recess arranged on a circumferential path of motion for engaging with the lock element in the closed position of the latch element and the locking position of the lock element, wherein the rotatable latch element further comprises at least one protrusion on the circumferential path of motion, which acts as a stop for the lock element, and wherein the system further comprises a signaling device configured to indicate a correct function when the lock element rests on the at least one protrusion.

2. The system according to claim 1, wherein the lock element is a locking lever swivably supported about a swivel axis in a distance to the circumferential surface section, the locking lever having an engagement surface on a first end, the engagement surface adapted to fit into the locking recess.

3. The system according to claim 2, wherein the engagement surface is divided into a first engagement surface section and a second engagement surface section, each following a curved line around the swivel axis with different mean radii of curvature relative to the swivel axis and enclosing a step therebetween.

4. The system according to claim 3, wherein the second engagement surface section is designed to be in a distance from the at least one protrusion in each possible position of the lock element and the latch element.

5. The system according to claim 2, wherein the signaling device is an optical signaling device including a second end of the lock element while at a distance to the swivel axis.

6. The system according to claim 1, comprising a plurality of locking devices, the latch drive device being commonly connected to the latch elements of the plurality of lock devices, wherein the protrusions of the latch elements are located at different rotational positions of the individual circumferential surface sections.

7. The system according to claim 1, further comprising a control unit coupled with the latch drive device and the lock drive device for controlling their operation, wherein the control unit is adapted for conducting a test sequence of the system, the test sequence comprising:

f) inducing a rotation of the latch drive device into a position corresponding to the protrusion of the at least one latch element, g) inducing a rotation of the lock drive device until it cannot move further.

8. The system according to claim 7, the test sequence further comprising:
   h) determining a position of the associated lock element,
   i) comparing a determined end position of the associated lock element and a predetermined end position of the associated lock element and
   j) generating a warning signal if the determined end position end the predetermined end position differ more than about a predetermined tolerance.

9. The system according to claim 7, wherein the control unit is adapted for inducing a series of test sequences for a plurality of locking devices.

10. A wing of an aircraft, comprising:
   a base wing having a connection region,
   a movable wing tip,
   a drive mechanism coupled with the wing tip for moving the wing tip relative to the base wing, and
   a system according to claim 1, wherein the at least one engagement device is integrated into the wing tip and wherein the at least one locking device is integrated into the base wing at the connection region.

11. An aircraft having at least one wing according to claim 10.

12. A method for testing the operability of a system for locking a foldable wing tip on an end of a wing of an aircraft, the method comprising:
   i) rotating a latch element, which is rotatably held in a support having a receiving space for an engagement device, to a test position, in which a protrusion arranged on a circumferential surface section is arranged in vicinity to a lock element, which is movably held on the support,
   ii) moving the lock element towards the circumferential surface section until the lock element cannot move further, and
   iii) observing through a signaling device, whether the position of the lock element corresponds to a predetermined position of the lock element in surface contact with the protrusion.

13. The method of claim 12, further comprising
   iv) determining a position of the lock element,
   v) comparing a determined end position of the associated lock element and a predetermined end position of the lock element and
   vi) generating a warning signal if the determined end position end the predetermined end position differ more than about a predetermined tolerance.

14. The method of claim 13, wherein the method further comprises repeating the steps i) to iii), and iv) to vi), respectively, for an additional latch element and a corresponding lock element, wherein the positions of the protrusions on the associated latch element differs from the protrusions of all remaining protrusions on the associated latch elements.

* * * * *